UNITED STATES PATENT OFFICE.

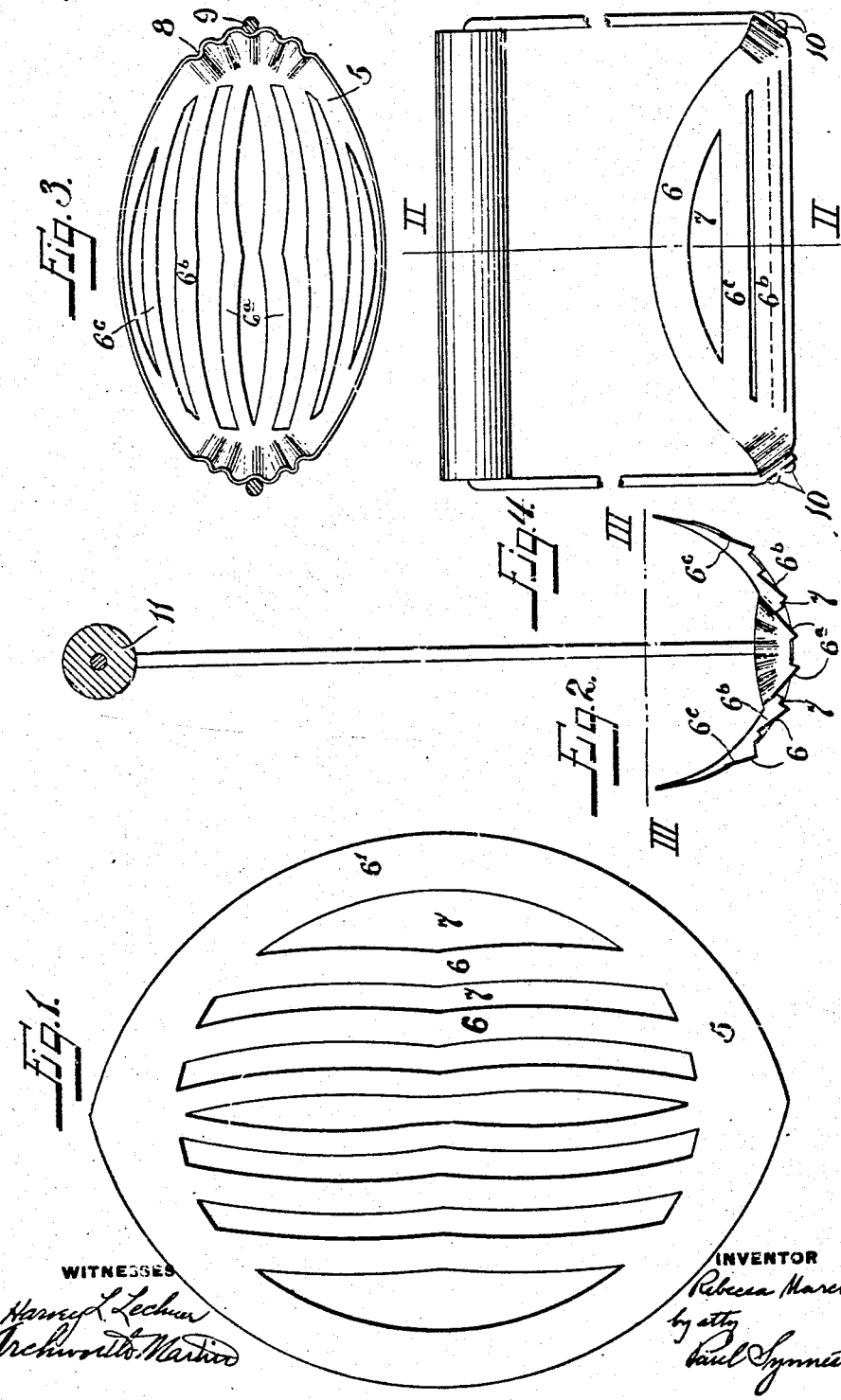

REBECCA MARCHAND, OF PITTSBURG, PENNSYLVANIA.

DOUGH-MIXER.

No. 920,484.　　　　Specification of Letters Patent.　　　Patented May 4, 1909.

Application filed June 5, 1908.　Serial No. 436,959.

*To all whom it may concern:*

Be it known that I, REBECCA MARCHAND, a citizen of the United States, residing at Pittsburg, in the county of Allegheny and State of Pennsylvania, have invented certain new and useful Improvements in Dough-Mixers, of which the following is a specification.

This invention has reference to the provision of an improved form of device for mixing dough or like material, and has particular reference to the provision of an improved device for mixing flour and shortening for use in the making of cake and similar pastry.

The first of the objects of my invention is the provision of an apparatus of the character specified which will thoroughly intermix the flour and lard or other shortening medium, without the necessity of using the hands in direct contact with the mixture, and which will accomplish such mixing with a minimum expenditure of labor, and within a minimum time.

A further object of my invention is the provision of a device of the character described which will mix the substances referred to, so as to secure a mixture which is extremely light and yet entirely uniform.

The above, as well as such other objects as may hereinafter appear, I attain by means of a construction which I have illustrated in a preferred form in the accompanying drawings, wherein—

Figure 1 shows in plan view the blank as it is stamped out of sheet metal, from which the body portion of my device is made;

Figure 2 is a sectional view taken on the line II—II of Figure 4, indicating the formation of the blades or slats, and the angular positioning of the same;

Figure 3 is a plan sectional view on the line III—III of Figure 2, and

Figure 4 is a side elevation of the device, with the handle part broken and shortened, such side elevation indicating the attachment of the handle to the body portion.

Referring now more particularly to Figure 1, it will be seen that in carrying out my invention I provide first a piece preferably stamped out of sheet metal in the shape indicated, and marked 5, such sheet metal piece being provided with bars or slats 6 and apertures or spaces 7 preferably of about the shape indicated in Figure 1. The sheet metal piece has a rim 6′ extending entirely round the outside of the body portion, which rim also strengthens the same and affords a support for the ends of the slats or bars.

The blank indicated in Figure 1 is next pressed or bent up in cup shape, this being accomplished partly by the use of corrugations 8, as indicated in Figure 3, and then the side bars of the handle indicated at 9 are secured by means of a couple of rivets 10. The gripping portion of the handle 11 is mounted as shown in Figures 2 and 4, so that the operator can secure a good firm hold to exert the muscular force required to mix the material.

The slats or bars 6 in the body of the device are caused to take the angular positions indicated in Figure 2, the first pair, specifically indicated by the reference characters $6^a$, being at the greatest angle to the line of the handle, while the second pair, $6^b$, have less angularity, and the third pair marked $6^c$ have still less angularity with respect to the handle portion, whence it follows that the flour and shortening or other material, as the blades are drawn upward and downward through it, will, by the angularity of the blades $6^a$ be pressed laterally inward and outward and then caught in turn (after passing through the apertures 7 between the adjacent blades) by the succeeding blades $6^b$ which will press them further laterally, outward or inward, according to the movement of the device, and thus secure a thorough mixture of the entire mass.

Having thus described my invention and illustrated its use, what I claim as new and desire to secure by Letters Patent, is the following:

1. A mixing device comprising a body portion having a plurality of angularly disposed bars with apertures between said bars, and an operating handle extending longitudinally over the bars and secured to the opposite ends of the body portion, substantially as described.

2. A mixing device comprising in combination, a body portion substantially cup shaped, and composed of a plurality of angularly disposed bars spaced apart, and a handle extending over the body portion and secured to the opposite edges thereof, substantially as described.

3. A mixing device comprising in combination, a handle and an attached body portion consisting of a plurality of bars, said bars being oppositely disposed and angularly placed with respect to said handle, substantially as described.

4. A mixing device comprising in combination, a handle and an attached body portion consisting of a plurality of bars, said bars being oppositely disposed and angularly placed with respect to said handle, the bars next the handle having the greatest angularity with respect thereto.

5. A mixing device comprising a body portion and handle, the body portion being of a barred or grated form dished or cupped, and provided with corrugations on its edge, substantially as described.

In testimony whereof I have hereunto signed my name in the presence of the subscribed witnesses.

REBECCA MARCHAND.

Witnesses:
J. C. BRADLEY,
ARCHWORTH MARTIN.